United States Patent [19]

Sauerwein et al.

[11] 4,250,613

[45] Feb. 17, 1981

[54] METHOD OF ASSEMBLING A COMMUTATOR BRUSH SYSTEM

[75] Inventors: William D. Sauerwein, Joppa; Richard E. Walton, II, Fallston, both of Md.

[73] Assignee: Black & Decker Inc., Newark, Del.

[21] Appl. No.: 69,643

[22] Filed: Aug. 27, 1979

Related U.S. Application Data

[62] Division of Ser. No. 827,144, Aug. 24, 1977, Pat. No. 4,190,781.

[51] Int. Cl.$^{3}$ ..................... H01R 43/12; H02K 15/00; H02K 39/38

[52] U.S. Cl. ........................................ 29/597; 310/239

[58] Field of Search .................. 29/597; 310/239-247, 310/42, 50, 71

[56] References Cited

U.S. PATENT DOCUMENTS

| | | | |
|---|---|---|---|
| 1,651,059 | 11/1927 | Janette | 310/249 |
| 2,045,293 | 6/1936 | Carlson | 310/245 |
| 2,453,114 | 11/1948 | Brandt | 310/247 |
| 2,454,230 | 11/1948 | Stickney | 310/247 |
| 2,454,909 | 11/1948 | Bylund | 310/247 |
| 2,794,139 | 5/1957 | Horner | 310/239 |
| 3,034,006 | 5/1962 | Short | 310/239 |
| 3,959,677 | 5/1976 | Grieb | 310/50 |
| 4,110,651 | 8/1978 | Fagan | 310/239 |

*Primary Examiner*—Carl E. Hall

*Attorney, Agent, or Firm*—Leonard Bloom; Edward D. Murphy; Harold Weinstein

[57] ABSTRACT

The invention is directed to a brush system for an electric motor device having a motor housing made either of electrically conductive or electrically insulating material. The brush system for an electric motor mounted in the housing made of electrically insulating material includes a conductive sleeve mounted in the housing so as to cause a portion of the sleeve to protrude beyond the housing. A carbon brush is provided for contacting the commutator of the electric motor. This carbon brush is slideably disposed in and is electrically connected to the sleeve. A spring resiliently biases the carbon brush to extend beyond the sleeve and to resiliently hold the carbon brush against the commutator. A terminal holds an electric lead of the motor. This terminal includes an uninterrupted annular portion which is press-fitted onto and completely surrounds the protruding portion of the sleeve. In electric motor devices wherein the housing is made of metal, the brush system will also include an annular insulated body mounted in the motor housing. The conductive tubular sleeve is then mounted in this insulating body so that a portion of the sleeve protrudes out from the end of the insulating body thereby facilitating attachment of the terminal thereto.

6 Claims, 6 Drawing Figures

METHOD OF ASSEMBLING A COMMUTATOR BRUSH SYSTEM

This application is a division of application Ser. No. 827,144, filed Aug. 24, 1977, now U.S. Pat. No. 4,190,781.

BACKGROUND OF THE INVENTION

The invention relates to an improved brush system for an electric motor device which is virtually immune to motor vibration and which facilitates assembly into a motor housing both at the time of motor assembly and later, in the event that servicing is required.

The brush system for an electric motor device will normally include a conductive tubular sleeve mounted in the housing of the motor. This sleeve will be insulated from the housing if the housing is made of metal. It has long been the practice to connect a lead from the motor to this tubular sleeve with the aid of a brass clip which is pre-wired to the motor lead. The brass clip snaps onto the tubular sleeve and is tension-held thereon. Often the connection is obtained by a nut threadably engaging the tubular sleeve and holding a lug to the tubular sleeve.

In electric motor devices this and similar arrangements have lead to serious problems because of the vibration which accompanys operation of the motor device. This is especially true in portable electric power tools such as hammer drills and the like wherein the electric motor of the tool is subjected to continuous vibration during use. The vibration causes relative movement of the clip and sleeve which in turn causes wear and generates heat. These combine to reduce the forces attaching the clip to the sleeve which results in intermittent contact. Once physical separation begins, electrical arcing occurs which generates further heat and errosion of the parts until the system disentegrates with the result that an entire new brush system must be installed. Often, the commutator of the motor too is irreparably damaged and must either be re-cut or entirely replaced.

A similar sequence of events can occur during normal wearing out of a brush, that is, increased arcing of the worn out brush generates heat in the clip area which weakens the clip causing arcing between clip and sleeve and subsequent errosion of both parts such that they must be replaced along with the brushes. On the other hand, it has been found that screws or other threaded members utilized in lieu of clips also present difficulties because they tend to loosen because of vibration.

The above-described brush systems of the prior art require a costly and time-consuming assembly procedure when the brush system is mounted in the housing of the electric motor during manufacture of, say, a portable electric tool. Specifically, the electric clip or lug is secured by hand to the conductive sleeve and this manufacturing step requires intricate manual movements because the assembly often must be made within the interior of a small motor housing. Also, when it comes time to service the motor, the service personnel must likewise diassemble and assemble the brush system within the housing of the tool.

SUMMARY OF THE INVENTION

In view of the foregoing, it is an object of our invention to provide a brush system wherein the connection thereto will not loosen because of vibration of the device wherein the brush system is mounted. It is another object of our invention to provide a brush system and method of assembly therefor wherein it is possible to connect the motor lead to the brush system outside of the motor housing thereby avoiding the manufacturing step of connecting the terminal to the conductive sleeve within the motor housing.

It is still another object of our invention to provide a brush system wherein it is possible to make the connection between the terminal and the conductive sleeve inside the motor housing without the necessity of an operator making intricate manual connections inside the motor housing.

The brush system according to our invention includes as a feature an annular insulating body mountable in the motor housing. A conductive tubular sleeve is mounted in this body so as to cause a portion of the sleeve to protrude out from one end of the insulating body. A carbon brush is slideably disposed in and electrically connected to the tubular sleeve and a biasing means such as a compression spring biases the carbon brush so as to extend beyond the sleeve. A terminal for holding the electric lead is also provided and it is a further feature of our invention that this terminal include an uninterrupted annular portion press-fitted onto and completely surrounding the above mentioned protruding portion of the sleeve.

According to another feature of the invention, the terminal can be configured so that the uninterrupted annular portion has a cylinder-like inner wall in press-fitting engagement with the protruding end portion of the conductive tubular sleeve. According to still another feature of our invention, the inner diameter of the angular portion of the terminal and the outer diameter of the end portion of the conductive tubular sleeve are selected so as to cause the annular portion to be stressed into the plastic range of the material of which it is made when the annular portion is press-fitted onto the end portion of the sleeve.

According to still another embodiment of our invention, annular insulating disc means can be provided between the terminal and the housing for insulating the terminal with respect to the housing. The annular insulating disc means can be in the form of a separate annular disc disposed in surrounding relation to the conductive tubular sleeve and interposed between the annular portion of the terminal and the housing; or, the annular insulating disc means can be a flange-like extension of the insulating body and extend between the annular portion of the terminal and the housing.

When the housing of the motor is made of electrically-insulating material such as plastic, both annular insulating body and the disc means are not needed.

The method according to an embodiment of our invention is performed by the steps of connecting the terminal of the brush system to a lead of the electric motor. The annular insulating body containing the conductive tubular sleeve is mounted into the housing to cause the protruding portion of the conductive tubular sleeve to extend into the interior of the housing. Then, the annular portion of the terminal is press-fitted over the protruding portion of the sleeve.

According to another embodiment of the method of our invention, an annular insulating disc is placed between the annular portion of the terminal and the housing and then the step of press-fitting the annular portion of the terminal over the protruding portion of the conductive tubular sleeve is performed thereby positioning the disc in insulating relationship between the housing and the terminal.

BRIEF DESCRIPTION OF THE DRAWING

The above objects and advantages of our invention will become more apparent from a consideration of the detailed description to follow taken in conjunction with the drawing annexed hereto wherein.

DESCRIPTION OF THE PREFERRED EMBODIMENTS OF THE INVENTION

Figure 1:
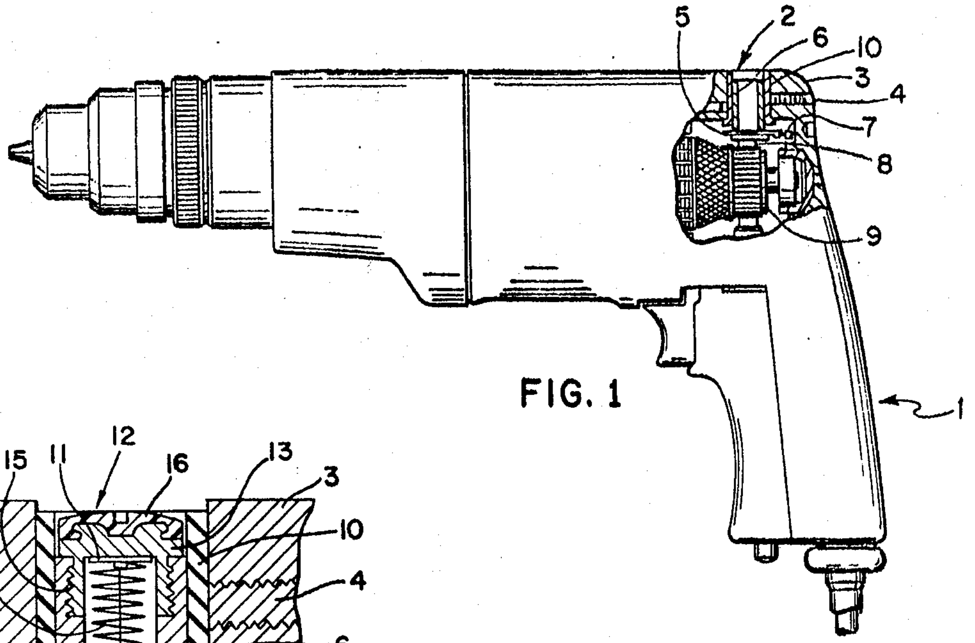
FIG. 1 is an elevation view of a portable electric tool such as a hammer-drill equipped with a brush system according to the invention.

Referring to FIG. 1, reference numeral 1 designates a portable hammer-drill equipped with a brush system according to the invention. A portion of the motor housing 3 of the tool is broken away and the brush system is shown and designated by reference numeral 2. The brush system is mounted in the motor housing 3 and is held in place with the aid of a set screw 4. The terminal 5 is made of a ductile material such as half-hard brass and is press-fitted to the end of a conductive tubular sleeve 6 and is connected to a lead 7 of the motor. The brush 8 bears resiliently against the commutator 9 of the motor.

Figure 2:
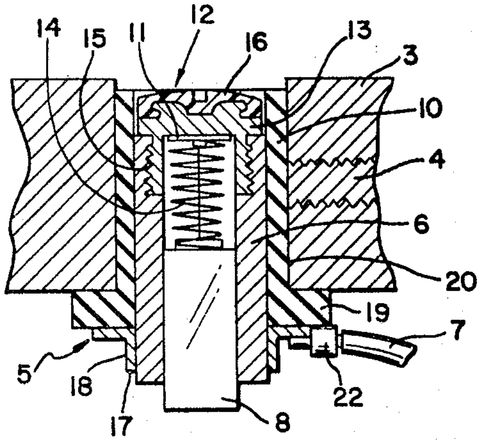
FIG. 2 is an elevation view, partially in section, of the brush system according to one preferred embodiment of the invention suitable for electric motor wherein the housing is made of metal.

In FIG. 2, a detail view of one embodiment of the brush system of our invention is illustrated. The annular insulating body 10 is mounted in the motor housing 3 which also constitutes part of the casing of the tool 1 and is made of metal. The conductive tubular sleeve 6 is mounted in the body 10 so as to cause a portion of the sleeve to protrude out from one end of the body. A carbon brush 8 is slideably disposed in and electrically connected to the tubular sleeve 6. The electrical connection of the brush 8 to the tubular sleeve 6 is achieved with the aid of a braided wire connected between the brush 8 and a contact disc 11. The contact disc 11 is resiliently held against a brass portion 13 of plug 12 by a compression spring 14. The brass portion 13 of the plug 12 threadably engages the conductive tubular sleeve 6 at the threaded interface 15. Plug 12 also has a plastic top portion 16 to protect the operator of the tool from electric shock. The terminal 5 includes a lateral extension 22 crimp-connected to the motor lead 7.

The terminal 5 includes an uninterrupted annular portion designated by reference numeral 17 which engages the end of the conductive tubular sleeve 6 protruding out from the annular insulating body 10. Preferably, the uninterrupted annular portion 17 has a cylinder-like inner wall 18 in press-fitting engagement with the protruding end portion of sleeve 6.

Figure 3:
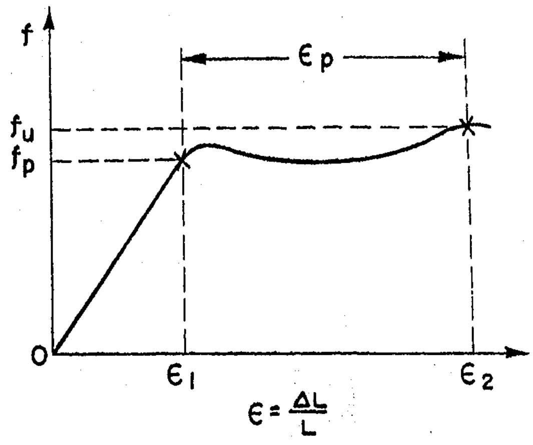
FIG. 3 is a stress-strain diagram representative of the ductile materials from which the terminal of the brush system of the invention can be made.

FIG. 3 illustrates the stress-strain curve for the ductile material of which the terminal is made. The horizontal axis of the graph $\Delta L/L$ represents the strain e. Where L is the length and $\Delta L$ is the deformation experienced by a length L of material. The vertical axis represents the stress to which the material is subjected when a load is applied thereto. The segment of the curve between the origin $f_p$ represents the range in which the material exhibits complete proportionality, that is, the material when stretched under load will return to virtually its original length after the loading force is removed. However, between the limit of proportionality ($f_p$, $e_1$) and the ultimate stress point ($f_u$, $e_2$) the material is in the plastic range $e_p$. Although the material is loaded into the plastic range and substantially deformed, it will still develop considerable holding force while in the deformed condition.

Stated otherwise, even though the material cannot return to its original length when the load placing the material in the plastic range is removed, the material will contract to a size substantially less than its expanded length. Accordingly, when the terminal is press-fitted onto the sleeve so that a force is developed in the terminal which places it in the plastic range, the material exhibits a restoring force which wants to return the terminal to the last-mentioned contracted length.

With reference to FIG. 3, it becomes manifest that close tolerances are required between the conductive tubular sleeve 6 and the terminal 5 if a sufficient holding force is going to be achieved in the proportional range. The reason for this is that the curve in this range is so steep that a loading force near the proportional limit will admit of only a small variation in the strain. However, if the material is loaded to the point where the material is placed in the plastic range, tolerances need not be held nearly so tight as they would have to be in the proportional range because, when the load places the material in the plastic range, the deformation which occurs is much greater and this deformation will compensate for variations in tolerances. Accordingly, if the press-fit is made such that the material of the terminal is brought into the plastic range during the press-fitting operation, substantial cost savings are realized in the manufacturing process because the conductive tubular sleeve 6 and the terminal 5 will not have to be maintained at the close tolerances which would be required if the terminal were not loaded so as to place it into the plastic range.

We have found for example that tolerances between the terminal 5 and conductive tubular sleeve 6 of 0.0005 were needed in order to achieve a good press-fit connection in the proportional range. However, in the plastic range, a good press-fit is obtained if tolerances of only 0.003 are maintained between these two parts. Therefore, and according to a further feature of our invention, we select the inner diameter of the annular portion of the terminal and the outer diameter of the end portion of the conductive tubular sleeve 6 to have dimensions which will cause the annular portion to be stressed into the plastic range of the material when the annular portion is press-fitted onto the end portion of the sleeve 6.

Referring again to FIG. 2, it is noted that the annular insulating body 10 has a lateral extending portion 19 integral therewith. This lateral extending portion 19 can be considered as annular insulating disc means and seats against the inner wall of the motor housing 3. Accordingly, in the embodiment of FIG. 2, during assembly of the brush system, the insulating body 10 is inserted from within the housing into an opening 20 in the housing wall. The annular insulating disc means then serves to seat the insulating body 10 and also serves to act to insulate the terminal 5 from the housing 3 which here is made of metal.

Figure 4:
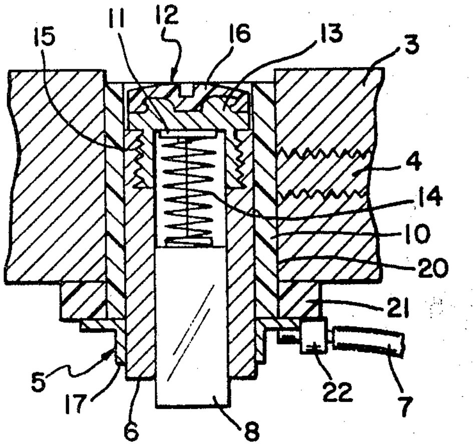
FIG. 4 is an alternate embodiment of the brush system according to the invention wherein an annular insulating disc is provided between the terminal and the inner wall of the motor device.

FIG. 4 is directed to an embodiment of our invention suitable for use with a method of manufacture wherein the annular insulating body 10 is inserted into an opening 20 of the housing 3 from outside of the housing to such a depth that a small portion thereof extends into the interior of the housing 3. In this embodiment annular insulating disc means in the form of an annular insulating disc 21 is provided and is disposed in surrounding relation to the conductive tubular sleeve 6 and annular insulating body 10 as shown. The terminal 5 is then press-fitted from inside the housing 3 onto the conductive tubular sleeve 6 protruding beyond the annular insulating body 10 thereby trapping the annular insulating disc 21.

Figure 5:
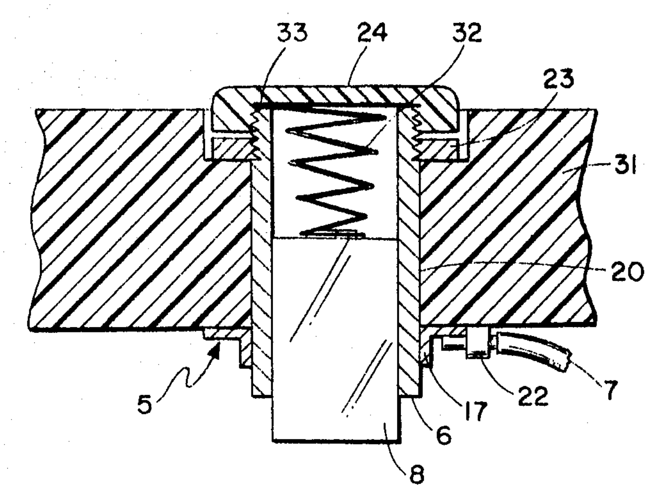
FIG. 5 is an elevation view, partially in section, illustrating a preferred embodiment of the brush system according to the invention suitable for mounting in an electric motor device having a housing made of electrically insulating material; and, FIG. 6 is a schematic diagram illustrating how a preferred embodiment of the method of our invention is performed.

FIG. 5 is directed to an embodiment of our invention suited especially to electric motor devices wherein the motor housing is made of electrically insulating material. In this embodiment, the annular insulating body is not needed and the conductive tubular sleeve is simply inserted into the opening 20 in the plastic housing 31. Also, the annular insulating disc means is likewise not needed. The terminal 5 is pressed onto the conductive tubular sleeve 6. This embodiment is most conveniently assembled by simply inserting the sleeve 6 with the terminal 5 press-fitted thereon from the inside of the housing 31. A flat nut 23 threadably engages the other end of the sleeve 6 and secures the brush system in the wall of the housing 31. A plastic cap 24 also threadably engages the sleeve 6 and covers over the flat nut 23 to protect the operator of the tool from electric shock. The plastic cap 24 also traps a turn of the spring 32 between the cap and the end-face 33 of the sleeve 6. In the embodiment of FIG. 5, the spring 32 serves to connect the brush 8 to the sleeve 6.

Figure 6:
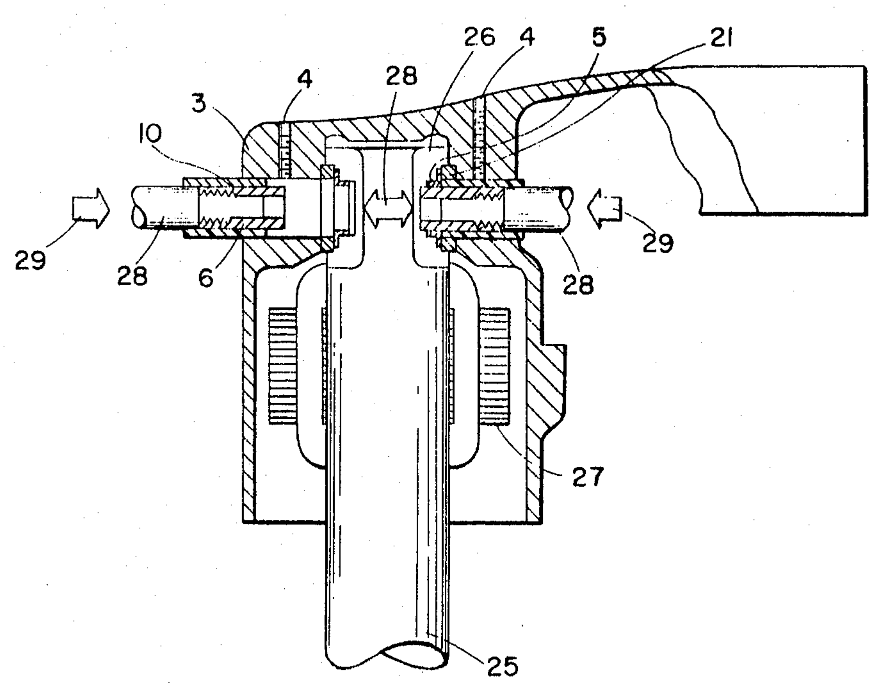

FIG. 6 illustrates an embodiment of the method according to our invention for assembling the brush system shown in FIG. 4. An assembly plug 25 is equipped with a solenoid arrangement 28 for actuating holding pads 26. The field 27 of the motor is preassembled with the motor leads 7 connected to the terminals 5. The field 27 is mounted on the plug 25 the terminals 5 and annular insulating disc 21 are loaded into the holders 26 in position to later receive the sleeve 6. The capability of being able to place the terminals 5 and discs 21 into position to receive the sleeve 6 is a very substantial advantage of the method of our invention because it eliminates the intricate manual movements which assemblying personnel had to perform in manufacturing methods wherein the brush system was hurried up with the field already mounted in the motor housing.

After the terminals 5 and discs 21 are positioned, the housing 3 is then placed over the plug 25 and field 27 so that the openings 20 therein are in alignment with the terminals 5 and annular insulating discs 21. Rams 28 are now actuated by solenoids 29 and insert the annular insulating body 10 containing the conductive tubular sleeve 6 therein into the openings 20 of the housing 3. After the annular insulating bodies 10 have been properly seated, the solenoid 25 is actuated and the holders 26 are urged outwardly toward the conductive tubular sleeves 6 causing the terminal 5 to be press-fitted onto the protruding portion of the sleeve 6 thereby establishing a firm and permanent connection between the terminal and the sleeve 6. In the same operation, the annular insulating disc 21 is trapped between the terminal 5 and the inner wall of the housing 3 thereby insulating the terminal 5 from the housing 3. The set screw 4 is then tightened locking the annular insulating body and therefore the entire brush system firmly in place.

Should repair service ultimately be required, new brush systems are easily installed from within the housing. For repair service, the repair personnel are supplied with brush systems wherein the terminal 5 has been press-fitted to the conductive tubular sleeve 6 at the factory. The sleeve 6 is also factory mounted in the annular insulating body 10. Then, at the repair site, all that the maintenance personnel need do is to crimp-connect the motor lead to the terminal 5 and then insert the annular insulating body 10 into the opening 20 of the housing 3 with the annular insulating disc 21 resting on the terminal 5. The set screw 4 is then tightened and the brush 8 is inserted from the outside into the sleeve 6.

The brush system according to the invention has the further advantage that should the set screw loosen during the use of the tool, the compression spring 14 will serve to hold the brush system in the opening 20 because of the flange effect of the terminal 5 pressing against the insulting disc 21 under the resilient reaction force developed by the spring 14 when the brush 8 presses down against the commutator 9.

We claim:

1. The method of assemblying a brush system in an electric motor having a substantially enclosed housing, the brush system including an annular insulating body having a conductive tubular sleeve mounted therein so as to cause a portion of the sleeve to protrude out from one end of the body, a carbon brush slideably mounted in said sleeve and electrically connected to the tubular sleeve, and a terminal for holding an electric lead, the terminal having an uninterrupted annular portion, the method comprising the steps of:

connecting said terminal to a lead of the electric motor;

mounting said annular insulating body into said housing to cause the protruding portion of said sleeve to extend into the interior of said housing; and, press-fitting said annular portion of said terminal over the protruding portion of said sleeve.

2. The method of claim 1, comprising the step of placing an annular insulating disc between said annular portion and said housing and then performing the step of press-fitting said annular portion of said terminal over the protruding portion of said sleeve thereby locating said disc in insulating relation between said housing and said terminal.

3. The method of assemblying a brush system in an electric motor having a substantially enclosed housing, the brush system including an annular insulating body having a conductive tubular sleeve mounted therein so as to cause an end portion of the sleeve to protrude out from one end of the body, a carbon brush slideably mounted in said sleeve and electrically connected to the tubular sleeve, and a terminal for holding an electric lead, the terminal having an uninterrupted annular portion, the method comprising the steps of:

connecting said terminal to a lead of the field of the electric motor;

placing said housing over the field and said terminal so that a brush holder opening of said housing is in substantial alignment with said terminal;

mounting said annular insulating body into said housing to cause the protruding portion of said sleeve to extend into the interior of said housing; and, press-fitting said annular portion of said terminal over the protruding portion of said sleeve.

4. The method of claim 3, comprising the step of placing an annular insulating disc between said annular portion and said housing and then performing the step of press-fitting said annular portion of said terminal over the protruding portion of said sleeve thereby locating said disc in insulating relation between said housing and said terminal.

5. The method of assemblying a brush system in an electric motor having a substantially enclosed housing, the brush system including an annular insulating body having a conductive tubular sleeve mounted therein so as to cause an end portion of the sleeve to protrude out from one end of the body, a carbon brush slideably mounted in said sleeve and electrically connected to the tubular sleeve, and a terminal for holding an electric lead, the terminal having an uninterrupted annular portion, the method comprising the steps of:

connecting said terminal to a lead of the stator of the electric motor;

positioning said annular portion of said terminal inside said housing beneath an opening in said housing; and, inserting said annular insulating body into said opening so as to cause said end portion of said sleeve to press-fittingly engage said annular portion of said terminal.

6. The method of claim 5 comprising the step of placing an annular insulating disc between said annular portion and said housing and then performing the step of inserting said annular insulating body.

* * * * *